United States Patent
Zhao et al.

(10) Patent No.: US 10,449,507 B2
(45) Date of Patent: Oct. 22, 2019

(54) METHODS AND SYSTEMS FOR CONVERTING CARBON DIOXIDE INTO GRAPHENE

(71) Applicant: EAST CHINA UNIVERSITY OF SCIENCE AND TECHNOLOGY, Shanghai (CN)

(72) Inventors: Chongjun Zhao, Shanghai (CN); Jianbo Dong, Shanghai (CN); Youfu Huang, Shanghai (CN); Xiuzhen Qian, Shanghai (CN)

(73) Assignee: Empire Technology Development, LLC, Wilmington, DE (US)

(*) Notice: Subject to any disclaimer, the term of this patent is extended or adjusted under 35 U.S.C. 154(b) by 324 days.

(21) Appl. No.: 15/313,855

(22) PCT Filed: May 30, 2014

(86) PCT No.: PCT/CN2014/078987
§ 371 (c)(1),
(2) Date: Nov. 23, 2016

(87) PCT Pub. No.: WO2015/180163
PCT Pub. Date: Dec. 3, 2015

(65) Prior Publication Data
US 2017/0189886 A1   Jul. 6, 2017

(51) Int. Cl.
*B01J 19/02* (2006.01)
*B01J 19/12* (2006.01)
(Continued)

(52) U.S. Cl.
CPC ............ *B01J 19/02* (2013.01); *B01J 19/121* (2013.01); *C01B 32/184* (2017.08);
(Continued)

(58) Field of Classification Search
CPC .. B01J 19/02; B01J 19/121; B01J 2219/0281; B01J 2219/0254; B01J 2219/0236; B01J 2219/0263; C01B 32/186; C01B 32/184
(Continued)

(56) References Cited

U.S. PATENT DOCUMENTS 7,807,025 B2 * 10/2010 Maekawa ............... B01J 19/121
                                                   204/157.41
8,038,849 B2 * 10/2011 Maekawa ............... B01J 19/121
                                                   204/157.41
(Continued)

FOREIGN PATENT DOCUMENTS

CN      103112844 A    5/2013
CN      103508450 A    1/2014
(Continued)

OTHER PUBLICATIONS

Chakrabarti, A., et al., "Conversion of carbon dioxide to few-layer graphene," Journal of Materials Chemistry, vol. 21, pp. 9491-9493 (2011).
(Continued)

*Primary Examiner* — Nicholas A Smith
*Assistant Examiner* — Colleen M Raphael

(57) ABSTRACT

Methods for converting carbon dioxide ($CO_2$) into graphene are described. The methods include contacting a metal with gaseous carbon dioxide, and irradiating a surface of the metal with at least one laser beam to convert the gaseous carbon dioxide into graphene on the surface of the metal. Systems for converting carbon dioxide into graphene are also described.

25 Claims, 7 Drawing Sheets

(51) Int. Cl.
*C01B 32/184* (2017.01)
*C01B 32/186* (2017.01)

(52) U.S. Cl.
CPC ..... *C01B 32/186* (2017.08); *B01J 2219/0236* (2013.01); *B01J 2219/0254* (2013.01); *B01J 2219/0263* (2013.01); *B01J 2219/0281* (2013.01)

(58) Field of Classification Search
USPC ....... 204/157.41, 157.47; 427/586, 582, 584, 427/596–597, 249.1–249.14, 249.6
See application file for complete search history.

(56) References Cited

U.S. PATENT DOCUMENTS

| | | | | |
|---|---|---|---|---|
| 2010/0255219 | A1* | 10/2010 | Wenxu | H05B 3/145 977/742 |
| 2011/0300338 | A1* | 12/2011 | Shin | B82Y 30/00 977/734 |
| 2012/0048195 | A1 | 3/2012 | Lin | |
| 2012/0132353 | A1* | 5/2012 | Hauck | B82Y 30/00 977/734 |
| 2012/0196074 | A1* | 8/2012 | Ago | B82Y 30/00 977/734 |
| 2012/0258587 | A1* | 10/2012 | Kub | B82Y 30/00 977/842 |
| 2013/0022813 | A1* | 1/2013 | Tang | B82Y 30/00 977/734 |

FOREIGN PATENT DOCUMENTS

| | | |
|---|---|---|
| CN | 103539104 A | 1/2014 |
| CN | 103572247 A | 2/2014 |
| WO | 2012040303 A1 | 3/2012 |
| WO | 2013036272 A1 | 3/2013 |

OTHER PUBLICATIONS

International Search Report and Written Opininon for International Application No. PCT/CN2014/078987 dated Feb. 27, 2015, pp. 9.

Yannopoulos, S.N., et al., "CO2 Laser-Induced Growth of Epitaxial Graphene on 6H-SiC(0001)," Advanced Functional Materials, vol. 22, pp. 113-120 (2012).

* cited by examiner

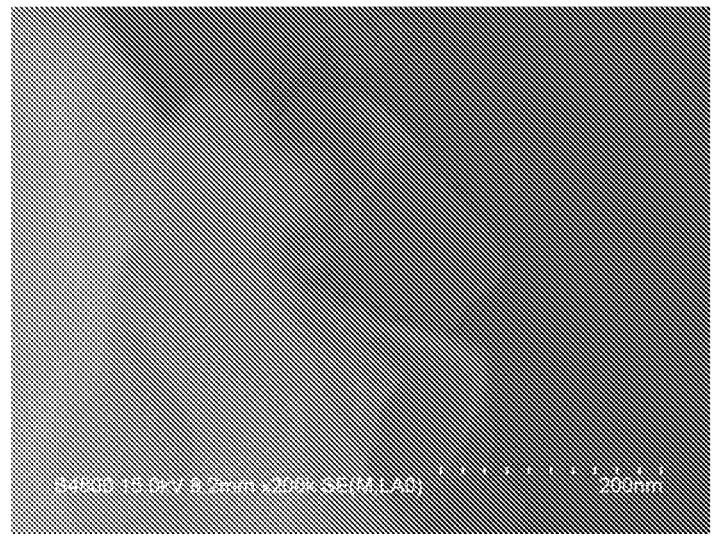
Figure 4A
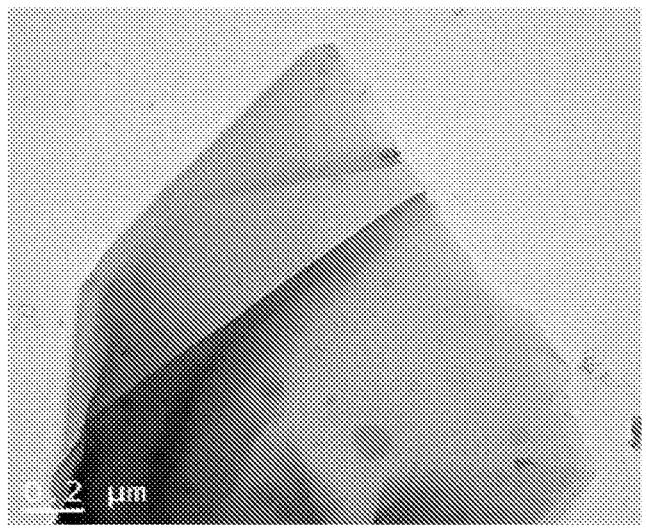
Figure 4B
Figure 4

Figure 5A
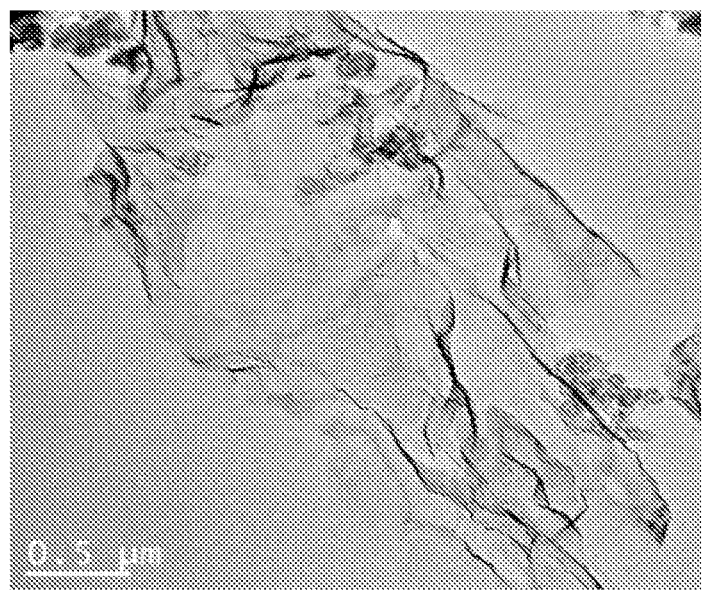
Figure 5B
Figure 5

Figure 6A
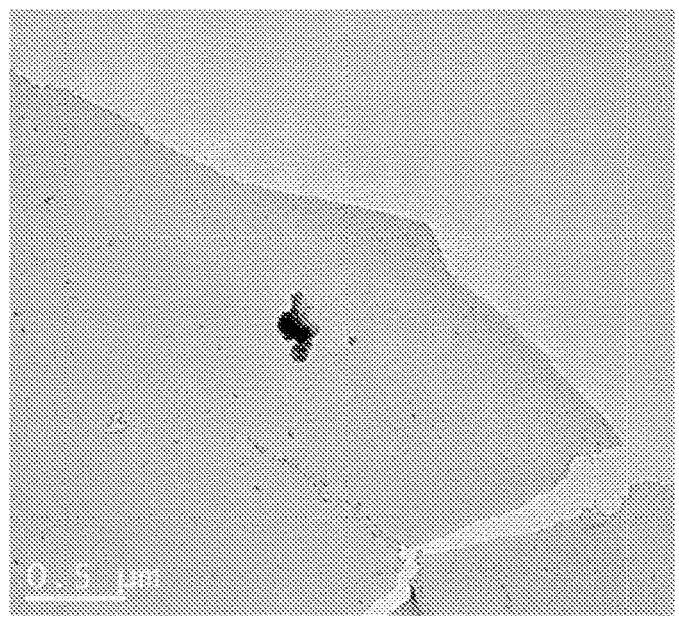
Figure 6B
Figure 6

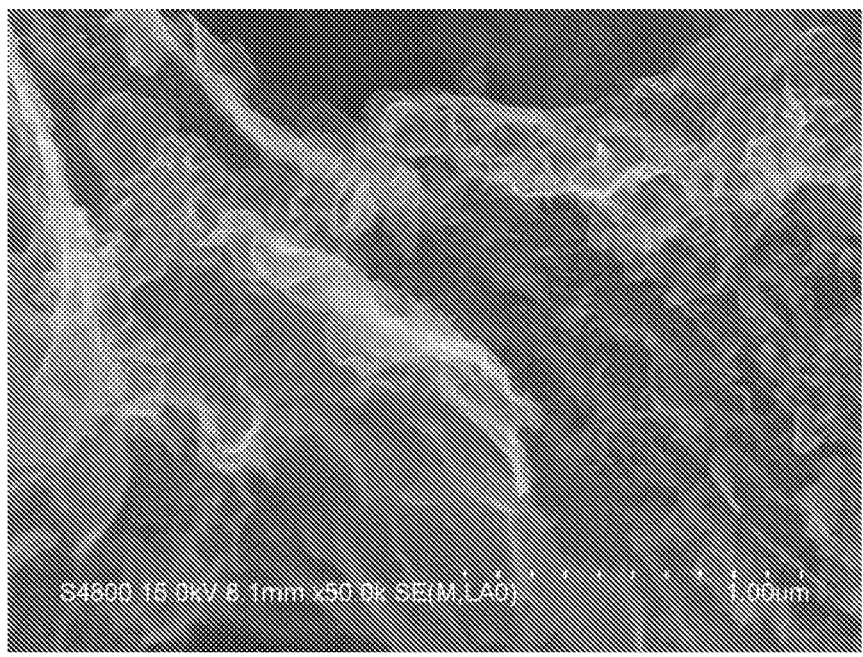
Figure 7A
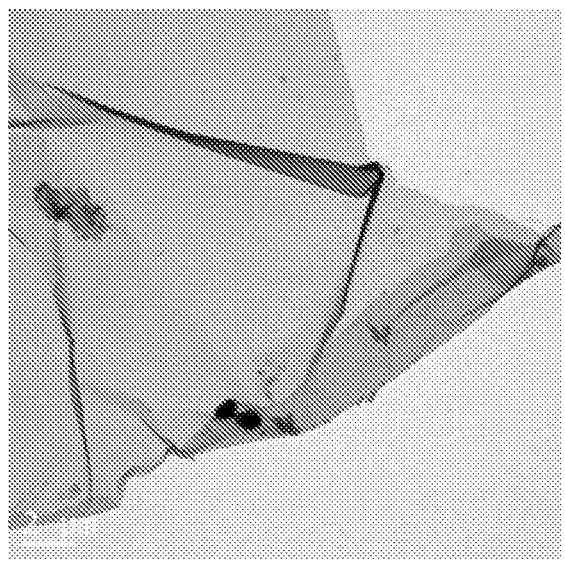
Figure 7B
Figure 7

METHODS AND SYSTEMS FOR CONVERTING CARBON DIOXIDE INTO GRAPHENE

CROSS-REFERENCE TO RELATED APPLICATIONS

This application is a U.S. national stage filing under 35 U.S.C. § 371 of PCT International Application No. PCT/CN2014/078987 filed on 30 May 2014.

BACKGROUND

Unless otherwise indicated herein, the materials described in this section are not prior art to the claims in this application and are not admitted to be prior art by inclusion in this section.

Graphene and its composites have extensive applications in a wide variety of fields such as energy storage and electronics. Current methods of preparing graphene include micro-mechanical exfoliation, chemical vapor deposition, and chemical oxidation. However these methods have not been able to achieve both fast and large scale preparation of graphene. For example, the preparing of graphene using these methods can take several weeks or longer, and can involve a series of complex steps. These challenges have been known to result in a technical bottle-neck for widespread adoption of graphene. There is therefore a desire for alternative methods and systems for preparing graphene that are fast, simple, inexpensive, and easily operable.

SUMMARY OF THE INVENTION

In a first aspect, a method for converting carbon dioxide ($CO_2$) into graphene is described. The method can comprise contacting a metal with gaseous carbon dioxide, and irradiating a surface of the metal with a laser beam to convert the gaseous carbon dioxide into graphene on the surface of the metal.

In a second aspect, a system for converting carbon dioxide into graphene is described. The system can comprise a reaction vessel configured to contact a metal with gaseous carbon dioxide, and a laser device configured to irradiate a surface of the metal with a laser beam to convert the gaseous carbon dioxide into graphene on the surface of the metal.

BRIEF DESCRIPTION OF THE DRAWINGS

FIGS. 4A and 4B show micrographs from scanning electron microscope (SEM) and transmission electron microscope (TEM), respectively, of graphene prepared in accordance with the method in Example 4.

FIGS. 5A and 5B show micrographs from SEM and TEM, respectively, of graphene prepared in accordance with the method in Example 5.

FIGS. 6A and 6B show micrographs from SEM and TEM, respectively, of graphene prepared in accordance with the method in Example 6.

FIGS. 7A and 7B show micrographs from SEM and TEM, respectively, of graphene prepared in accordance with the method in Example 7.

DETAILED DESCRIPTION

Figure 1:
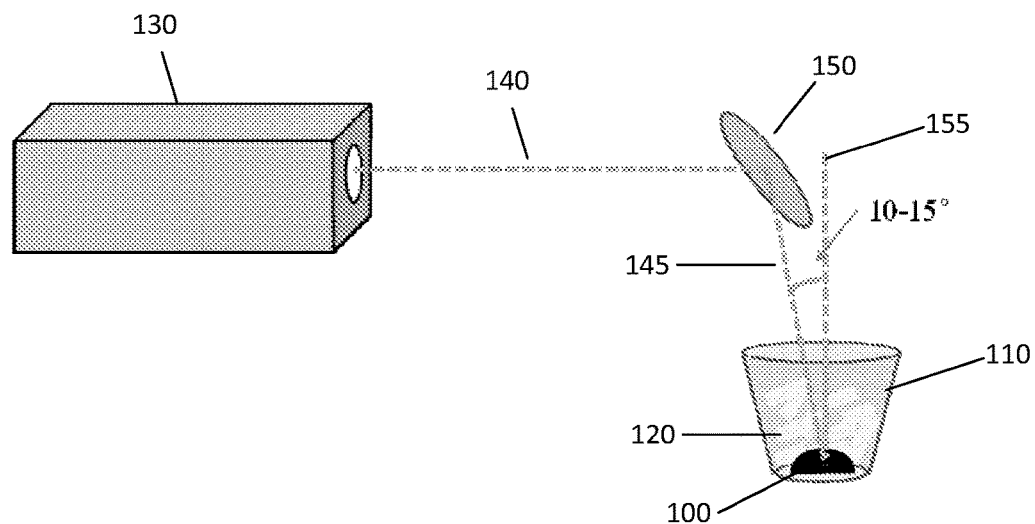
FIG. 1 shows a schematic diagram of a system for preparing graphene on a metal powder surface using a carbon dioxide laser device in accordance with some embodiments.

"Graphene" as described herein refers to carbon in the form of thin sheets of one atom thick. As a crystalline allotrope of carbon with 2-dimensional properties, graphene can be lightweight and yet exhibit mechanical strength. Other characteristics of graphene include excellent electrical, optical, and thermal properties. As such, graphene and its composites have extensive applications in a wide variety of fields such as energy storage, and electronics.

Increasing attention has been drawn to environmental challenges resulting from $CO_2$ emissions. An effective way to ameliorate the $CO_2$ emissions problem can be to convert $CO_2$ into other functional compounds or materials, for example, graphene.

Methods for Converting Carbon Dioxide ($CO_2$) into Graphene

As a carbon source, $CO_2$ can be converted into graphene in accordance with the methods and systems described in the disclosed embodiments. In some embodiments, graphene with fewer or no surface defects can be obtained, as the methods and systems described herein do not involve strong oxidation-reduction processes like in conventional chemical oxidation methods.

In some embodiments a method for converting carbon dioxide ($CO_2$) into graphene includes contacting a metal with gaseous carbon dioxide, and irradiating a surface of the metal with at least one laser beam to convert the gaseous carbon dioxide into graphene on the surface of the metal. The method can produce graphene in minutes, for example, with the laser irradiation, the gaseous carbon dioxide can be converted into graphene on the surface of the metal in no more than about 5 minutes. The contacting of the metal with the gaseous carbon dioxide may be carried out in a reaction vessel. In some embodiments, the method further includes providing solid carbon dioxide (for example, dry ice) and the metal in a reaction vessel, and subliming the solid carbon dioxide to form the gaseous carbon dioxide before the contacting step. The subliming of the solid carbon dioxide into gaseous carbon dioxide may be carried out at temperatures above the sublimation temperature, for example, above about −78.5° C. at atmospheric pressure. In some embodiments, the subliming is carried out at an atmospheric pressure and at a temperature of about −78.5° C., about −60° C., about −40° C., about −20° C., about 0° C., about 10° C., about 20° C., about 25° C., about 30° C. or a temperature between any of these values. The subliming of the solid carbon dioxide into gaseous carbon dioxide may, for example, occur for generally any period of time, such as a time period of at least about 5 minutes, for example, about 6 minutes, about 7 minutes, about 8 minutes, about 9 minutes, about 10 minutes, or a time period between any of these values.

The surface of the metal can be locally heated to an elevated or high temperature using the laser beam, such that the gaseous carbon dioxide can be converted to graphene on the surface of the metal. In some embodiments, the irradiating of the surface of the metal with the laser beam locally heats the surface of the metal to an elevated temperature, such as a temperature of at least about 400° C. In some embodiments, the metal is locally heated to a temperature of about 400° C. In some embodiments the metal is locally heated to a temperature equal to or less than about 900° C. In some embodiments, the metal is locally heated to a temperature of about 400° C., about 450° C., about 500° C., about 550° C., about 600° C., about 650° C., about 700° C., about 750° C., about 800° C., about 850° C., about 900° C., or any other temperature between any of these values. In some embodiments, the irradiating is performed for generally any period of time, such as a time period of at least about 1 minute. In some embodiments, the irradiating is performed for a time period equal to or less than about 5 minutes. For example, the irradiating can be performed for a time period of about 1 minute, about 2 minutes, about 3 minutes, about 4 minutes, about 5 minutes, or any other time period between these values.

The metal can generally be any metal. In some embodiments, the metal is lithium, sodium, potassium, aluminum, zinc, magnesium, or a combination thereof. In some embodiments, the metal is in powder form. In some embodiments, the metal is in the form of one or more pieces of the metal. In some embodiments, the one or more pieces of the metal have one or more surfaces arranged to receive the laser beam. In some embodiments, the one or more surfaces of the one or more pieces of metal are arranged horizontally or parallel with respect to a bottom surface of the reaction vessel. As the laser beam may not be able to irradiate all surfaces of the one or more pieces of the metal, the irradiating step may include irradiating the surface of at least one of the one or more pieces of the metal, and moving the laser beam to irradiate at least another one of the one or more pieces of the metal.

The laser beam can generally be produced by any suitable device. In some embodiments, the laser beam is produced by a carbon dioxide laser device. In some embodiments, the laser beam is produced by an optical fiber laser device. The laser beam may, in some embodiments, directly irradiate the surface of the metal. In other embodiments, the laser beam indirectly irradiates the surface of the metal, for example, the laser beam is reflected off a reflector onto the surface of the metal. In some embodiments, the laser beam that is reflected off the reflector is incident on the surface of the metal at an angle of at least about 10 degrees from a vertical of the surface of the metal. The providing of the light beam at the described angle from the vertical can avoid reflection of the laser beam (for example, from the reflector, the metal surface and/or a surface within the reaction vessel) back towards the laser device, and thus avoid damage to the laser device by the reflected laser beam. As used herein, the "vertical" refers to a line or plane substantially perpendicular to the surface of the metal. The laser beam that is reflected off the reflector may be incident on the surface of the metal at an angle from the vertical of about 10 degrees, about 11 degrees, about 12 degrees, about 13 degrees, about 14 degrees, about 15 degrees, or any other angle between these values. In some embodiments, the laser beam that is reflected off the reflector may is incident on the surface of the metal at an angle of less than or equal to about 15 degrees from a vertical of the surface of the metal.

The width of the laser beam may be expanded to increase the area of irradiation on the surface of the metal. In some embodiments, the laser beam is an expanded laser beam. In some embodiments, the expanded laser beam irradiates a substantial portion of the surface of the metal. The expanded laser beam can irradiate the substantial portion of the surface of the metal at one time without moving the laser beam. In some embodiments, the expanded laser beam irradiates substantially an entire surface of the metal. The expanded laser beam can irradiate substantially an entire surface of the metal at one time without moving the laser beam. Where the metal includes one or more pieces arranged within the reaction vessel, after irradiating the at least one of the one or more pieces of metal, the laser beam can be moved to irradiate at least another one of the one or more pieces of metal.

In some embodiments, the surface of the metal is irradiated until a substantial portion of the metal has been converted into metal oxide. In some embodiments, additional metal may be supplied during the irradiating step to replace the metal that has been converted into the metal oxide. Additional carbon dioxide, either in gaseous form or dry ice form, may also be supplied to replenish carbon dioxide that has converted into graphene. The supply of the additional metal and the carbon dioxide can be performed continuously as the metal converts to the metal oxide, thereby allowing the method of converting the $CO_2$ into graphene to occur continuously. In some embodiments, the method further includes harvesting the graphene by removing the graphene from the surface of the metal. The removal can be achieved, for example, by using a spatula, a blade, or a spoon to remove the graphene from the surface of the metal. Alternatively, where the metal is a powder, the powder can be rinsed to separate the graphene from the surface of the metal powder.

Systems for Converting Carbon Dioxide ($CO_2$) into Graphene

In some embodiments, a system for converting carbon dioxide ($CO_2$) into graphene includes at least one reaction vessel configured to contact a metal with gaseous carbon dioxide, and at least one laser device configured to irradiate a surface of the metal with a laser beam to convert the gaseous carbon dioxide into graphene on the surface of the metal. In some embodiments, the reaction vessel is further configured to receive solid carbon dioxide (for example, dry ice), and to sublime the solid carbon dioxide to form the gaseous carbon dioxide. The reaction vessel can be configured to be at a temperature that is above the sublimation temperature of the solid carbon dioxide as described above, for example, above about −78.5° C. at atmospheric pressure.

The laser device can operate in a continuous or in a pulsed mode. In several embodiments described herein, the laser device operates in the continuous mode. The laser device can be a high power laser device, and can for example be a high power laser device that operates in the continuous mode, for example, a carbon dioxide laser device or an optical fiber laser device. Such a laser device can be low in cost and can provide extremely high heating effect. In some embodiments, the laser device is a $CO_2$ laser device. In some embodiments, the laser device is an optical fiber laser device. The laser device can be configured to irradiate the surface of the metal with the laser beam such that the surface is locally heated to a high temperature to cause the gaseous carbon dioxide to convert into graphene on the surface of the metal. In some embodiments, the laser device is configured to provide a laser beam that locally heats the surface of the metal to an elevated temperature, such as a temperature of at least about 400° C. In some embodiments, the laser device is configured to provide a laser beam that locally heats the surface of the metal to a temperature equal to or less than about 900° C. In some embodiments, the laser device is configured to provide a laser beam that locally heats the surface of the metal to a temperature of about 400° C., about 450° C., about 500° C., about 550° C., about 600° C., about 650° C., about 700° C., about 750° C., about 800° C., about 850° C., about 900° C., or a temperature between any of these values. The laser device can also be configured to irradiate the surface of the metal for a time period, such as a time period of at least about 1 minute, or equal to or less than about 5 minutes, as described above.

The reaction vessel can be designed to withstand the low temperatures produced by the solid carbon dioxide, for example, when the solid carbon dioxide sublimes to form gaseous carbon dioxide. In some embodiments, the reaction vessel is configured to allow the subliming of the solid carbon dioxide into gaseous carbon dioxide to occur for a time period, such as a time period of at least about 5 minutes as described above. The reaction vessel can also be designed to withstand the heat produced by the laser beam that locally heats the metal surface from sub-zero temperatures to a high temperature as described above (for example, at least about 400° C.) to cause the gaseous carbon dioxide to convert into graphene on the surface of the metal. In some embodiments, the reaction vessel is configured to be one or both of heat-resistant and cold-resistant. In some embodiments, the reaction vessel is made of ceramic, quartz, aluminum oxide, silicon carbide, or a combination thereof. In some embodiments, the reaction vessel is made of quartz. In some embodiments, the reaction vessel is made of corundum. In some embodiments, the reaction vessel is made of carborundum.

The metal can be generally any metal as described above, and can for example be lithium, sodium, potassium, aluminum, zinc, magnesium, or a combination thereof. The metal can be in powder form, or alternatively be in the form of one or more pieces of the metal. The one or more pieces of the metal may have one or more surfaces arranged to receive the laser beam, for example, the one or more surfaces of the one or more pieces of metal can be arranged horizontally with respect to a bottom surface of the reaction vessel.

In some embodiments, the laser device is configured to deliver the laser beam directly onto the surface of the metal. In other embodiments, the laser device is configured to deliver the laser beam indirectly onto the surface of the metal, for example, the laser beam is reflected off a reflector onto the surface of the metal. Accordingly, in some embodiments, the system further includes a reflector configured to receive the laser beam and to reflect the laser beam onto the surface of the metal. The reflector can be made of a reflective material, such as copper, silicon, gold, nickel, or a combination thereof. In some embodiments, the reflector is made of copper. In some embodiments, the reflector is made of silicon. The reflector can be in the form of a metal that is coated with a metal coating. The metal coating can be a gold coating, or can be a high reflectivity coating such as a nickel coating. In some embodiments, the reflector is made of copper coated with gold. In some embodiments, the reflector is made of copper coated with nickel. The dimensions of the reflector are not limited and may be at least partially dependent on the width of the laser beam. In some embodiments, the reflector has a diameter of about 25 mm to about 80 mm. In some embodiments, the reflector has a thickness of about 5 mm to about 25 mm. In some embodiments, the copper reflector has a diameter of about 25.0 mm to about 76.2 mm, and a thickness of about 5.1 mm to about 25.0 mm. In some embodiments, the silicon reflector has a diameter of about 25.4 mm to about 76.2 mm, and a thickness of about 3.0 mm to about 10.0 mm. In some embodiments, the reflector is configured to reflect the laser beam onto the surface of the metal at an incident angle of at least about 10 degrees from a vertical of the surface of the metal, or at an angle of less than or equal to about 15 degrees from a vertical of the surface of the metal, as described above.

The width of the laser beam may be expanded to increase the area of irradiation on the surface of the metal. In some embodiments, the system further includes a laser beam expander. In some embodiments, the laser beam expander includes an adjustable lens configured to expand a width of the laser beam. In some embodiments, the adjustable lens is made of zinc selenide. In some embodiments, the laser beam expander is configured to expand the laser beam to at least two times the width of the laser beam. In some embodiments, the laser beam expander is configured to expand the laser beam to equal to or less than five times the width of the laser beam. In some embodiments, the laser beam expander is configured to expand the width of the laser beam by about one and a half times, about two times, about two and a half times, about three times, about three and a half times, about four times, about four and a half times, about five times, or a value between these values. In some embodiments, the laser beam expander is configured to expand the laser beam to irradiate a substantial portion of the surface of the metal at one time. In some embodiments, the laser beam expander is configured to expand the laser beam to irradiate substantially an entire surface of the metal at one time. Where the metal includes one or more pieces arranged within the reaction vessel, the laser device may not be able to produce a laser beam that irradiates all surfaces of the one or more pieces of the metal at one time. In some embodiments, the laser device may be configured to deliver the laser beam such that the laser beam moves from one piece of the metal to another piece of the metal to irradiate the pieces of metal sequentially.

The surface of the metal is irradiated until at least a substantial portion of the metal has been converted into metal oxide. In some embodiments, the system further includes a supply of additional metal during the irradiation to replace the metal that has been converted into the metal oxide. The supply of the additional metal can be provided continuously as the metal converts to the metal oxide, thereby allowing the system to operate continuously. In some embodiments, the system further includes a spatula, a blade, a spoon, or other harvesting device to harvest the graphene by removing the graphene from the surface of the metal. Alternatively, where the metal is a powder, the powder can be rinsed to separate the graphene from the surface of the metal powder.

During the laser irradiation, a hot airflow may be formed between the formed graphene and the metal surface. Therefore, the graphene can rapidly drift away from the metal surface under the effect of the hot airflow, thereby avoiding excessive irradiation of the laser beam on the formed graphene. The hot airflow may also allow large sized single-layered graphene sheets to be formed on the metal surface. The dimensions of the graphene sheets that are formed are not particularly limited. For example, the graphene sheets that are formed can have a dimension of about 10 micrometers to about 90 micrometers.

High power laser devices as described herein, including optical fiber laser device and carbon dioxide laser device, are widely commercially available. They can be available in different power ratings, and the cost per unit power may not be high, thereby rendering the methods and systems described in the embodiments cost efficient.

EXAMPLES

Example 1: Formation of Graphene on a Metal Powder Surface

With reference to FIG. 1, a powder 100 of an active metal (Li, Na, K, Al, Zn, or Mg) is selected and added into a reaction vessel 110 and spread out evenly on a bottom surface of the reaction vessel. Dry ice or solid carbon dioxide 120 is placed around the powder 100 and allowed to stand for 5-10 minutes to produce gaseous carbon dioxide that contacts the metal powder 100. The solid carbon dioxide was arranged such that a portion of the surface of the metal power is exposed. A carbon dioxide laser device 130 is used as a laser source, and the laser beam 140 generated by the laser device 130 is reflected off a reflector 150 to form a subvertical beam 145. The subvertical beam 145 is incident on the metal powder surface at an angle of 10-15 degrees from a vertical 155 of the metal powder surface as to avoid damaging the laser device by any reflected laser beam. The laser beam is adjusted to irradiate the surface of the metal powder 100, and the gaseous carbon dioxide is converted into graphene on the surface of the metal powder as the metal powder 100 converts into metal oxide. The irradiation is allowed to proceed until all the powder 100 turns into black powder. The black graphene powder is collected using a spatula and rinsed with water.

Example 2: Formation of Graphene on Metal Pieces

Figure 2:
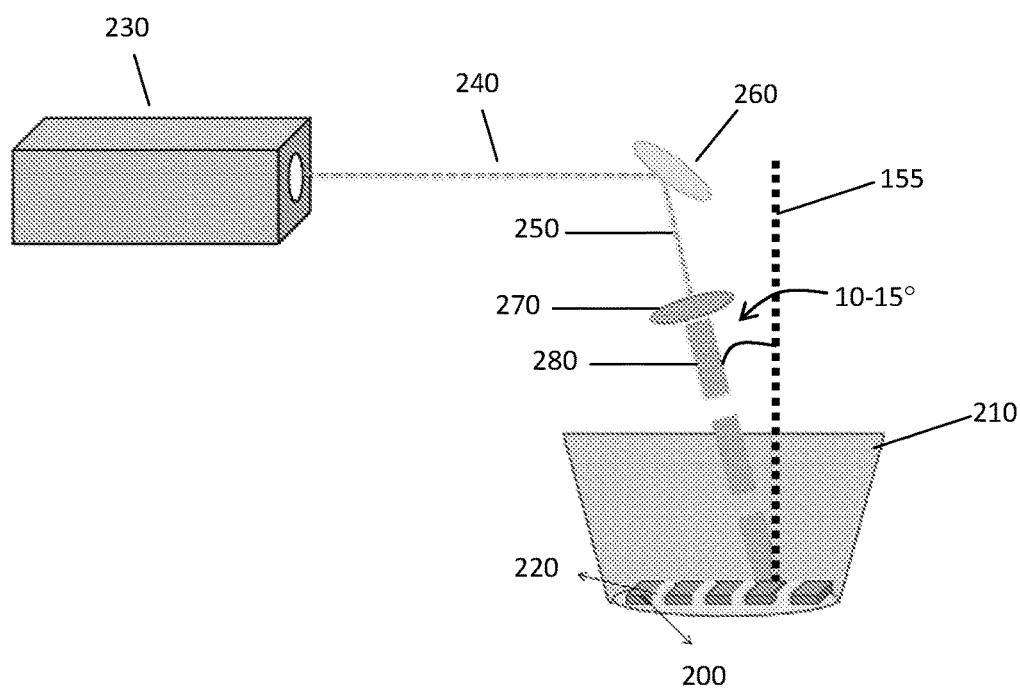
FIG. 2 shows a schematic diagram of a system for preparing graphene on surfaces of metal pieces using a carbon dioxide laser device in accordance with some embodiments.

With reference to FIG. 2, an active metal (Li, Na, K, Al, Zn, or Mg) is selected, and formed into thin and small pieces 200. The metal pieces 200 are added into a reaction vessel 210 and arranged separately from each other with their surfaces kept horizontal with respect to the bottom surface of the reaction vessel. Dry ice pieces 220 are then arranged in the gaps between the metal pieces 200 and left to stand for 5-10 minutes to produce gaseous carbon dioxide that contacts the metal pieces 200. A carbon dioxide laser device 230 is used as a laser source, and the laser beam 240 generated by the laser device 230 is reflected off a reflector 260 to form a subvertical beam 250. The subvertical beam 250 is incident on the surface of each of the metal pieces 200 at an angle of 10-15 degrees from a vertical 255 of the surface of the metal pieces 200 to avoid damage to the laser device by any reflected laser beam. The subvertical laser beam 250 is focused or expanded by an expander 270 by taking into consideration the surface size of each of the metal pieces. The irradiation area of the beam is made slightly larger than the area of the exposed surface of each metal piece 200. The expanded laser beam 280 is adjusted to irradiate onto the surface of one metal piece 200, and the gaseous carbon dioxide is converted into graphene continuously on the surface of the metal piece 200 under the thermal field of the laser beam. After the reaction on one metal piece 200 is completed, the laser beam 280 is adjusted to irradiate the next metal piece 200, and the process is repeated until all of the metal pieces have been irradiated to form graphene. The graphene preparation can be carried out continuously, by supplying new metal pieces 200 together with new dry ice pieces 220 during the irradiation. The formed black powder is collected with a spatula from the surfaces of the metal pieces 200, and rinsed to obtain graphene.

Example 3: Process of Obtaining Graphene Using an Optical Fiber Laser Device

Figure 3:
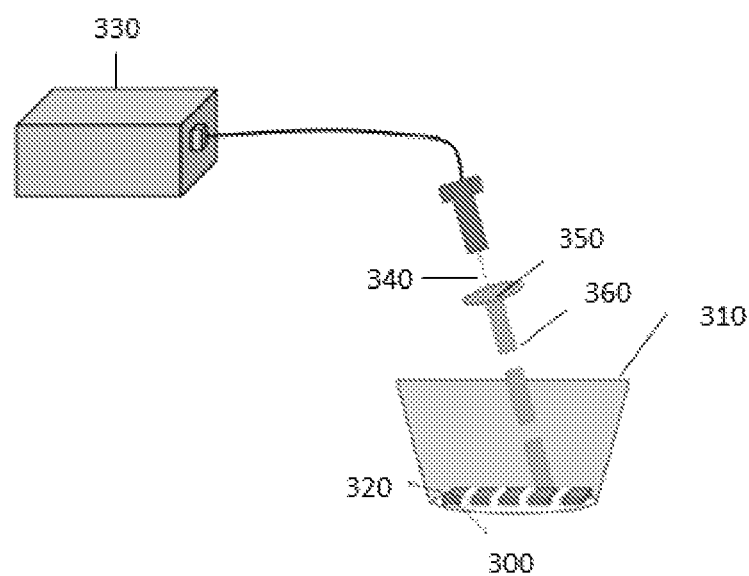
FIG. 3 shows a schematic diagram of a system for preparing graphene on surfaces of metal pieces using an optical fiber laser device in accordance with some embodiments.

With reference to FIG. 3, an active metal (Li, Na, K, Al, Zn, or Mg) is selected, and made into thin and small pieces 300. The metal pieces 300 are added into a reaction vessel 310 and arranged separately from each other with their surfaces kept horizontal with respect to the bottom surface of the reaction vessel. Dry ice pieces 320 are then arranged in the gaps between the metal pieces 300 and left to stand for 5-10 minutes to produce gaseous carbon dioxide that contacts the metal pieces 300. An optical fiber laser device 330 is used as a laser source. The laser beam 340 generated by the laser device 330 is focused or expanded by an expander 350 by taking into consideration the surface size of each of the metal pieces 300. The irradiation area of the laser beam is made slightly larger than the area of the exposed surface of each metal piece 300. The expanded laser beam 360 is adjusted to irradiate onto the surface of one metal piece 300, and the gaseous carbon dioxide is converted into graphene continuously on the surface of the metal piece 300 under the thermal field of the laser beam. After the reaction on one metal piece 300 is completed, the laser beam 360 is adjusted to irradiate the next metal 300 piece, and the process is repeated until all of the metal pieces have been irradiated to form graphene. The graphene preparation can be carried out continuously, by supplying new metal pieces 300 together with new dry ice pieces 320 during the irradiation. The formed black powder is collected with a spatula and rinsed to obtain graphene.

Example 4 Preparation of Graphene on Aluminum Powder

With reference to FIG. 4, the method of Example 1 was performed in which aluminum powder was used as the metal to prepare the graphene. Aluminum powder was added into the reaction vessel and spread out evenly on the bottom surface of the reaction vessel. Dry ice pieces were placed around the powder. The dry ice pieces were arranged such that a portion of the surface of the metal power is exposed. The dry ice pieces were allowed to stand for 5-10 minutes to produce gaseous carbon dioxide that contacts the aluminum powder. The carbon dioxide laser device was used as the laser source, and the laser beam generated by the laser source was reflected off the reflector to form the subvertical beam. The subvertical beam was incident on the surface of the aluminum powder at an angle of 10 degrees from the vertical of the surface of the powder. The laser beam was adjusted to irradiate the surface of the aluminum powder, and the gaseous carbon dioxide is continuously converted into graphene on the aluminum powder under the thermal field of the laser beam. The irradiation was allowed to proceed until all the aluminum powder turned into black powder. FIG. 4 shows the micrographs of the graphene obtained using scanning electron microscope (SEM) (FIG. 4A) and transmission electron microscope (TEM) (FIG. 4B) respectively. From FIGS. 4A and 4B, it was observed that single-layered graphene sheets were formed.

Example 5: Preparation of Graphene on Lithium Metal Pieces

With reference to FIG. 5, the method of Example 2 was performed in which lithium (Li) metal was used as the metal to prepare the graphene. The lithium metal was formed into thin and small pieces. The lithium metal pieces were added into the reaction vessel and arranged separately from each other with their surfaces kept horizontal with respect to the bottom surface of the reaction vessel. Dry ice pieces were then placed in the gaps between the metal pieces and left to stand for 5-10 minutes to produce gaseous carbon dioxide that contacts the metal pieces, thus placing the metal in a $CO_2$ atmosphere. A carbon dioxide laser device was used as the laser source, and the laser beam generated by the laser device was reflected off the reflector to form the subvertical beam. The subvertical beam was incident on the surface of each of the metal pieces at an angle of 10 degrees from the vertical of the surface of the metal pieces. The subvertical beam was focused or expanded by the expander by taking into consideration the surface size of the metal pieces. The irradiation area of the beam was made slightly larger than the area of the exposed surface of each metal piece. The expanded laser beam was adjusted to irradiate onto the surface of one metal piece, and the gaseous carbon dioxide is continuously converted into graphene on the surface of the lithium metal piece under the thermal field of the laser beam. After the reaction on one metal piece was completed, the laser beam was adjusted to irradiate the next metal piece, and the process was repeated until all of the metal pieces have been irradiated to form graphene. The graphene preparation was carried out continuously by supplying new metal pieces together with new dry ice pieces during the irradiation. The formed black powder was collected with a spatula and rinsed to obtain graphene. FIG. 5 shows respectively, the micrographs of the SEM (FIG. 5A) and TEM (FIG. 5B) of the obtained graphene. From FIGS. 5A and 5B, it was observed that single-layered graphene sheets were formed.

Example 6: Preparation from Graphene on Potassium Metal Pieces

With reference to FIG. 6, the method of Example 3 was performed, in which potassium (K) metal was used as the metal to prepare the graphene. The potassium metal was made into thin and small pieces. The potassium metal pieces were added into the reaction vessel and arranged separately from each other with their surfaces kept horizontal with respect to the bottom surface of the reaction vessel. Dry ice pieces were then placed in the gaps between the metal pieces and left to stand for 5-10 minutes to produce gaseous carbon dioxide that contacts the metal pieces, thus placing the potassium metal pieces in a $CO_2$ atmosphere. An optical fiber laser device was used as the laser source. The laser beam was focused or expanded by taking into consideration the surface size of each of the metal pieces. The irradiation area of the laser beam was made slightly larger than the area of the exposed surface of each metal piece. The expanded light beam was adjusted to irradiate onto the surface of one metal piece, and the gaseous carbon dioxide was continuously converted into graphene on the surface of the metal piece under the thermal field of the laser beam. After the reaction on one metal piece was completed, the laser beam was adjusted to irradiate the next metal piece and the process was repeated until all of the metal pieces have been irradiated to form graphene. The process of graphene preparation was carried out continuously by supplying new metal pieces and new dry ice pieces during the irradiation. The formed black powder was collected with a spatula and rinsed to obtain graphene. FIG. 6 shows respectively, the corresponding micrographs of the SEM (FIG. 6A) and TEM (FIG. 6B) of the obtained graphene. From FIGS. 6A and 6B, it was observed that single-layered graphene sheets were formed.

Example 7: Preparation of Graphene on Sodium Metal Pieces

With reference to FIG. 7, the method of Example 2 was performed in which sodium (Na) metal was used as the metal to prepare the graphene. The sodium metal was formed into thin and small pieces. The sodium metal pieces were added into a reaction vessel and arranged separately from each other with their surfaces kept horizontal with respect to the bottom surface of the reaction vessel. Dry ice pieces were arranged in the gaps between the metal pieces and allowed to stand for 5-10 minutes to produce gaseous carbon dioxide that contacts the metal pieces, thus placing the sodium metal pieces in a $CO_2$ atmosphere. A carbon dioxide laser device was used as the laser source, and the laser beam generated by the laser device was reflected off the reflector to form the subvertical beam. The subvertical beam was incident on the surface of the metal pieces at an angle of 10 degrees from a vertical of the surface of the metal pieces. The laser beam was focused or expanded by taking into consideration the surface size of the metal pieces. The irradiation area of the beam was made slightly larger than the area of the exposed surface of each metal piece. The expanded light beam was adjusted to irradiate onto the surface of one metal piece, and the gaseous carbon dioxide was continuously converted into graphene on the surface of the metal piece under the thermal field of the laser beam. After the reaction on one metal piece was completed, the laser beam was adjusted to irradiate the next metal piece, and the process was repeated until all of the metal pieces have been irradiated to form graphene. The process of graphene preparation was carried out continuously by supplying new metal pieces, together with new dry ice pieces, during the irradiation. The formed black powder was collected with a spoon and rinsed to obtain graphene. FIG. 7 shows respectively, the micrographs of the SEM (FIG. 7A) and TEM (FIG. 7B) of the obtained graphene. From FIGS. 7A and 7B, it was observed that single-layered graphene sheets were formed.

The Examples demonstrated that graphene sheets are formed by a simple process of converting $CO_2$ on a metal powder surface or a surface of a metal piece using a laser beam. The Examples also demonstrated that $CO_2$ can be converted into graphene, thereby providing an opportunity for $CO_2$ that is generated by other industrial processes to be converted into functional compounds like graphene instead of being released into the atmosphere.

With respect to the use of substantially any plural and/or singular terms herein, those having skill in the art can translate from the plural to the singular and/or from the singular to plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A method for converting carbon dioxide into graphene, the method comprising:
    providing solid carbon dioxide and a metal in a reaction vessel;
    subliming the solid carbon dioxide to form gaseous carbon dioxide;
    contacting the metal with gaseous carbon dioxide; and
    irradiating a surface of the metal with at least one laser beam to locally heat the surface of the metal to a temperature in a range of 400° C. to 900° C. and convert the gaseous carbon dioxide into graphene on the surface of the metal.

2. The method of claim 1, wherein subliming the solid carbon dioxide occurs for at least 5 minutes.

3. The method of claim 1, wherein the metal comprises lithium, sodium, potassium, aluminum, zinc, magnesium, or a combination thereof.

4. The method of claim 1, wherein the metal is in powder form.

5. The method of claim 1, wherein the metal comprises one or more pieces of the metal.

6. The method of claim 5, wherein irradiating the surface of the metal comprises irradiating a surface of at least one of the one or more pieces of the metal, and moving the laser beam to irradiate a surface of at least another one of the one or more pieces of the metal.

7. The method of claim 1, wherein the laser beam is produced by a carbon dioxide laser device or an optical fiber laser device.

8. The method of claim 1, wherein the laser beam is reflected off a reflector onto the surface of the metal.

9. The method of claim 8, wherein the laser beam that is reflected off the reflector is incident on the surface of the metal at an angle of at least 10 degrees from a vertical of the surface of the metal.

10. The method of claim 1, wherein the laser beam is an expanded laser beam.

11. The method of claim 10, wherein the expanded laser beam irradiates substantially an entirety of the surface of the metal.

12. The method of claim 1, wherein the surface of the metal is irradiated until a substantial portion of the metal has been converted into metal oxide.

13. The method of claim 12, further comprising supplying additional metal during the irradiating to replace the metal that has been converted into the metal oxide.

14. The method of claim 1, further comprising harvesting the graphene by removing the graphene from the surface of the metal.

15. The method of claim 1, wherein the irradiating is performed for a time period of at least 1 minute.

16. A system for converting carbon dioxide into graphene, the system comprising:

at least one reaction vessel configured to contact a metal with gaseous carbon dioxide, wherein the reaction vessel is further configured to receive solid carbon dioxide, and to sublime the solid carbon dioxide to form the gaseous carbon dioxide; and at least one laser device configured to irradiate a surface of the metal with a laser beam to locally heat the surface of the metal to a temperature in a range of 400° C. to 900° C. and convert the gaseous carbon dioxide into graphene on the surface of the metal.

17. The system of claim 16, further comprising a reflector configured to receive the laser beam and to reflect the laser beam onto the surface of the metal.

18. The system of claim 16, wherein the reaction vessel is configured to be one or both of heat-resistant and cold-resistant.

19. The system of claim 16, wherein the reaction vessel is made of ceramic, quartz, aluminum oxide, silicon carbide, corundum, carborundum, or a combination thereof.

20. The system of claim 16, wherein the laser device is a carbon dioxide laser device or an optical fiber laser device.

21. The system of claim 16, further comprising a laser beam expander.

22. The system of claim 21, wherein the laser beam expander comprises an adjustable lens configured to expand a width of the laser beam.

23. The system of claim 21, wherein the laser beam expander is configured to expand the laser beam to at least two times a width of the laser beam.

24. The system of claim 21, wherein the laser beam expander is configured to expand the laser beam to equal to or less than five times a width of the laser beam.

25. The system of claim 16, further comprising a spatula, a blade, or a spoon configured to remove graphene from the surface of the metal.

* * * * *

UNITED STATES PATENT AND TRADEMARK OFFICE
CERTIFICATE OF CORRECTION

PATENT NO. : 10,449,507 B2
APPLICATION NO. : 15/313855
DATED : October 22, 2019
INVENTOR(S) : Zhao et al.

Page 1 of 1

It is certified that error appears in the above-identified patent and that said Letters Patent is hereby corrected as shown below:

On the Title Page

In Item (73), under "Assignee", in Column 1, Lines 1-2, delete "Empire Technology Development, LLC, Wilmington, DE (US)" and insert -- EAST CHINA UNIVERSITY OF SCIENCE AND TECHNOLOGY, Shanghai (CN) --, therefor.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*